A.F.C. SPECTRUM LOCK-IN CIRCUIT

Filed Jan. 3, 1961 3 Sheets-Sheet 1

INVENTORS
CLYDE W. BAXTER
DAVID W. WEBER
BY Moody and Harris
ATTORNEYS

INVENTORS
CLYDE W. BAXTER
DAVID W. WEBER
BY Moody and Harris
ATTORNEYS

A.F.C. SPECTRUM LOCK-IN CIRCUIT

Filed Jan. 3, 1961 3 Sheets-Sheet 3

INVENTORS
CLYDE W. BAXTER
DAVID W. WEBER
BY Moody and Harris
ATTORNEYS 3,155,919

A.F.C. SPECTRUM LOCK-IN CIRCUIT

Clyde W. Baxter, Orlando, Fla., and David W. Weber, Cedar Rapids, Iowa, assignors to Collins Radio Company, Cedar Rapids, Iowa, a corporation of Iowa Filed Jan. 3, 1961, Ser. No. 80,317
3 Claims. (Cl. 331—19)

This invention relates to a frequency stabilizing network and more particularly to an electronic stabilizing network capable of correcting output frequency deviations of a high frequency oscillator over a wide range much greater than the pass band of said network.

In radio equipments, it is frequently desirable that one or more of the oscillators therein be stabilized to assure a predetermined constant frequency output. Such would be the case, for example, in a radio transmitter where the output frequency must be maintained substantially constant, a condition which, of course, can only be achieved if the generated carrier frequency is held constant by stabilizing the carrier frequency oscillator.

Various systems have been proposed and utilized heretofore for stabilizing an oscillator. One such system, for example, causes a spectrum of frequencies to be mixed with the output of a monitored high frequency oscillator in such a manner that a signal can be derived therefrom that may be detected and the resulting voltage applied through a reactance tube circuit to the oscillator to thereby stabilize the same.

It is to be noted, however, that the closed loop stabilization system of the above described system must have a pass band that is wide enough to pass the maximum error of the high frequency oscillator. In other words, the system is limited in correction to the width of the pass band. As long as the oscillator deviation, or frequency error, is within the pass band of the stabilizing loop, the system may operate satisfactorily. However, if the error should exceed the pass band, the oscillator cannot be corrected by the system and the oscillator will not lock at the predetermined desired frequency. While it has been suggested that the system could be enlarged to increase the pass band, such a solution would raise more problems, such as, for example, undesirably raising both costs and space requirements, as well as greatly increasing the probability of passing undesired signals.

The stabilizing device of this invention, on the other hand, is relatively compact and utilizes a relatively narrow pass band in the closed loop stabilization network but, nevertheless, is capable of sensing error and electronically causing correction of the monitored output even though the oscillator deviation, or error, is much greater than the pass band of the stabilization loop.

It is therefore an object of this invention to provide an improved and compact stabilizing network capable of correcting output frequency deviations of a high frequency oscillator regardless of the magnitude of the frequency error.

More specifically, it is an object of this invention to provide a stabilizing network capable of correcting the output frequency of a high frequency oscillator over a wide range that is not limited by the relatively narrow pass band of the network.

It is also an object of this invention to provide a stabilizing network capable of producing an error signal whenever the output frequency of a monitored high frequency oscillator is other than a predetermined frequency, which error signal is repeatedly applied during a sweep condition to the frequency determining network of the monitored high frequency oscillator until the output frequency is corrected.

It is yet another object of this invention to provide a stabilizing network having means for comparing the output from a monitored high frequency oscillator with a spectrum of referencing frequencies, means for producing an error signal if the output from the high frequency oscillator is other than a predetermined frequency and eliminating the same when in a fine tune condition, and means for repeatedly applying the error signal to the frequency determining network of the monitored oscillator during a sweep condition in such a manner that capture of said monitored oscillator is assured.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawings illustrate one complete example of the embodiment of the invention constructed according to the best mode so far devised for the practical application of the principles thereof, and in which.

Figure 1:
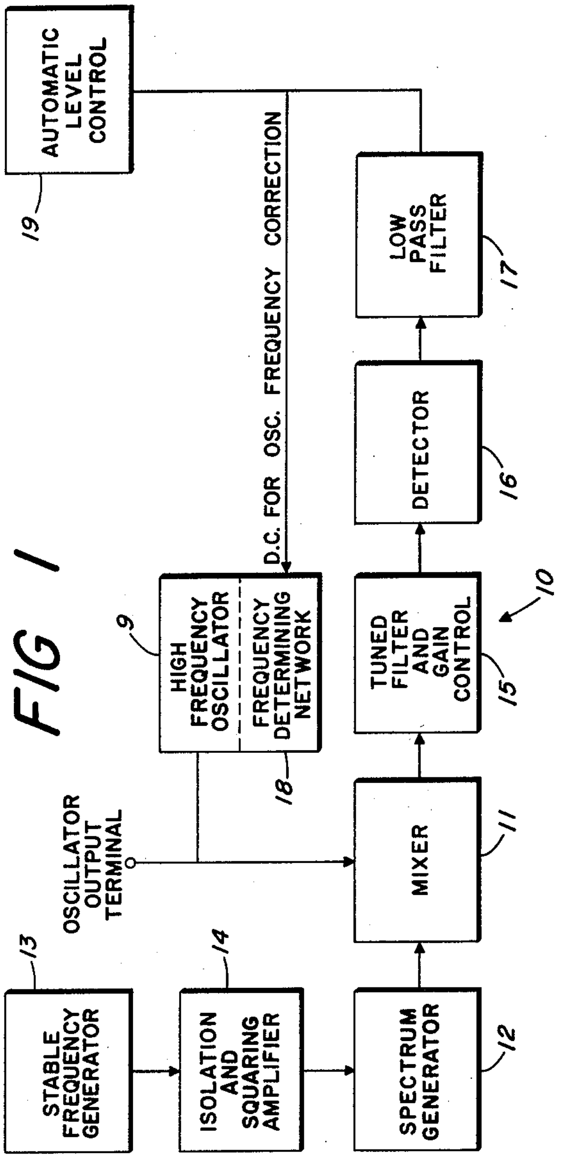
FIGURE 1 is a block diagram of the frequency stabilizing network of this invention.

Referring now to the drawings in which like numerals have been used for like characters throughout, the numeral 9 indicates a high frequency oscillator which may be stabilized by means of the stabilizing network 10 of this invention. The output from the high frequency oscillator may be applied to a mixer 11, which mixer receives a second input from spectrum generator 12. Spectrum generator 12 produces a series of equi-spaced referencing frequencies, as is well known in the art, when connected to a stable frequency generator 13, which connection is preferably made, as shown in FIGURE 1, through an isolation and squaring amplifier 14.

A tuned filter and gain control 15 may be connected to the output from mixer 11 to select a difference frequency that is a multiple of the frequency of stable frequency generator 13 for purposes to be brought out more fully hereinafter. In other words, tuned filter and gain control 15 is tuned to one of the $nf_1$ products of stable frequency generator 13. The output from tuned filter and gain control 15, which has the characteristics of an amplitude modulated signal when the monitored oscillator is in error, may be applied to a detector 16 and the resulting direct error voltage may then be applied to a low pass filter 17. The detected and smoothed direct error voltage may, in turn, be applied to the frequency determining network 18 of the high frequency oscillator 9 for frequency correction of the oscillator. Frequency determining network 18 includes, of course, a voltage sensitive element (not shown), such as for example, a Varicap.

An automatic level control 19 is provided to monitor the direct error voltage and divert the same to ground at a predetermined level. This permits the direct error voltage to be repeatedly applied to frequency determining network 18 and permits the utilization of a narrow pass band in the stabilization network. In other words, the stabilization system of this invention is not limited to the pass band of network 10 since the automatic level control 19 causes the error voltage to be repeatedly applied to the oscillator during a sweep condition (in which the D.C. voltage to the frequency sensitive element of the monitored oscillator is caused to vary from a predetermined minimum value to a predetermined maximum value to thereby cause the output frequency of the monitored oscillator to sweep a predetermined range of frequencies, as is well known in the art) to thereby cause the output frequency to be swept past the desired frequency until correction is achieved. Hence the network of this invention will correct the output frequency deviation of the oscillator regardless of the initial error, subject, of course, to the spacing between points of referencing frequencies supplied by the spectrum generator.

Figure 2:
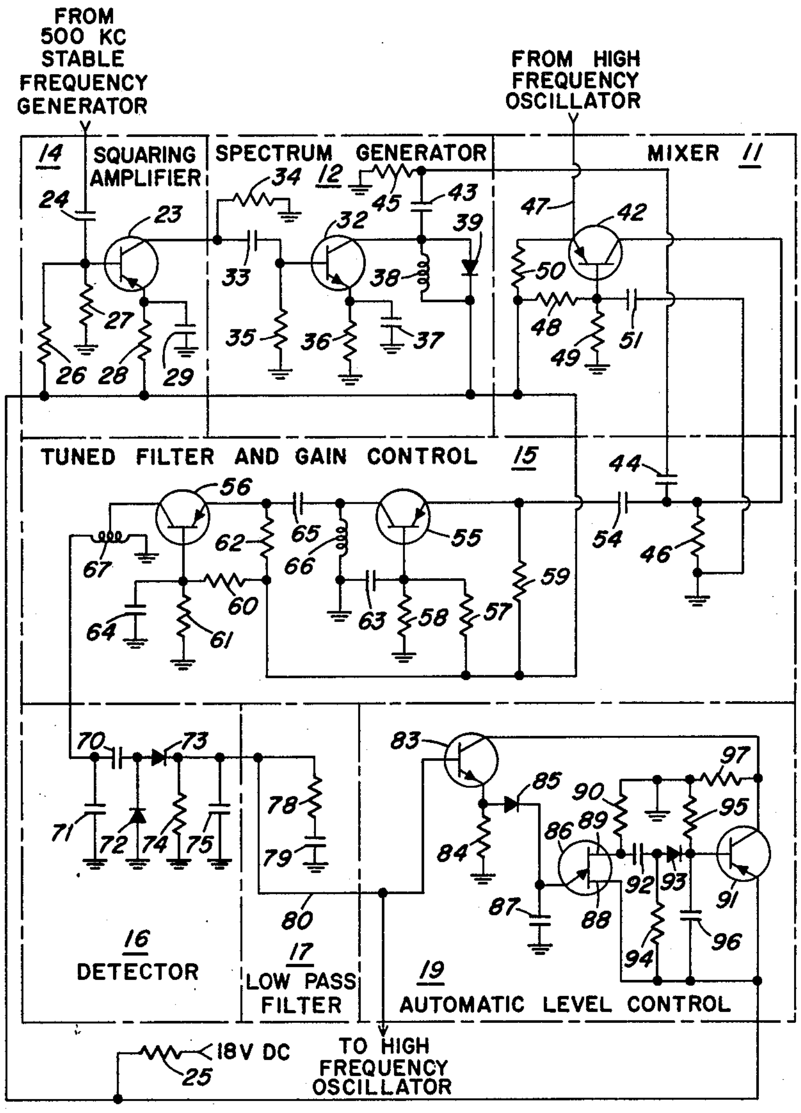
FIGURE 2 is a schematic presentation of the frequency stabilizing network of this invention.

FIGURE 2 illustrates a schematic presentation of circuitry which may be utilized in practicing this invention wherein the output frequency from stable frequency generator 13 is shown as 500 kc. and tuned filter and gain control 15 is tuned to one megacycle ($2f_1$ where $f_1$ is the frequency of stable frequency generator 13).

The 500 kc. signal may be applied to PNP type transistor 23 of isolation and squaring amplifier 14 through coupling capacitor 24. A voltage divider consisting of serially connected resistors 25, 26 and 27 may be connected between a +18 volt power supply and ground in that order, and the base of transistor 23 may be connected to the junction of resistors 26 and 27, while the emitter of transistor 23 may be connected through resistor 28 to the junction between resistors 25 and 26 to thus supply operating voltage for the transistor. In addition, a by-pass capacitor 29 may be provided from the emitter of transistor 23 to ground.

To couple the squared signal to spectrum generator 13 the collector of transistor 23 may be connected to the base of NPN type transistor 32 (of spectrum generator 12) through coupling capacitor 33 and grounded resistors 34 and 35 (connected at each side of capacitor 33). The emitter of transistor 32 may be connected to ground through resistor 36 and capacitor 37 connected in parallel. In addition, the collector of transistor 32 may be connected to the 18 v. power source through inductor 38 and diode 39 connected in parallel.

The output from spectrum generator 12 will be a series of referencing frequencies or points, all of which will be spaced a distance equal to that of the triggering stable frequency. Thus, if stable frequency generator 13 has an output frequency of 500 kc., the $nf_1$ products or referencing frequencies will be spaced 500 kc. To couple these referencing frequencies to mixer 11, the collector of transistor 32 may be connected to the collector of PNP type transistor 42 through coupling capacitors 43 and 44 and grounded resistors 45 and 46, which resistors may be connected between the junction of capacitors 43 and 44 and the junction of capacitor 44 and the collector of transistor 42, respectively.

A second input to mixer 11 is from the monitored high frequency oscillator. As shown in FIGURE 2, the output of high frequency oscillator 9 may be directly coupled to the emitter of transistor 42 through lead 47.

A voltage divider consisting of serially connected resistors 25, 48 and 49 may be connected between the 18 volt power supply and ground, in that order, and operating voltages for transistor 42 may be obtained by connecting the emitter of transistor 42 to the junction between resistors 25 and 48 through resistor 50, while the base of transistor 42 may be directly connected to the junction between resistors 48 and 49. In addition, a by-pass capacitor 51 may be connected between the base of transistor 42 and ground.

The output from mixer 11 may be coupled to tuned filter and gain control 15 through a coupling capacitor 54. Tuned filter and gain control 15 has a narrow pass band and is tuned to pass one of the $nf_1$ products. Hence if stable frequency generator 13 has an output frequency of 500 kc., and it is desired to pass the $2f_1$ products, tuned filter and gain control 15 will be tuned to one megacycle. This means that the spectrum of referencing frequencies supplied to mixer 11 must exceed the high frequency oscillator output frequency by one megacycle so that a three tone output (as explained hereinafter) may be obtained. Thus, if the frequency of oscillator 9 is twelve megacycles the referencing frequencies must at least go to thirteen megacycles.

As shown in FIGURE 2, tuned filter and gain control 15 may include a pair of PNP type transistors 55 and 56. To supply operating voltages for transistor 55, a voltage divider consisting of serially connected resistors 25, 57 and 58 may be provided between the 18 v. power supply and ground, with the emitter of transistor 55 being connected to the junction between resistors 25 and 57 by means of resistor 59, while the base of transistor 55 may be connected directly to the junction between resistors 57 and 58. In like manner, operating voltages may be provided for transistor 56 by means of a voltage divider comprising resistors 25, 60 and 61 with the emitter of transistor 56 being connected to the divider through resistor 62. In addition, the bases of transistors 55 and 56 may have by-pass capacitors 63 and 64, respectively, connecting them to ground.

To couple the signal from transistor 55 to transistor 56, the collector of transistor 55 may be connected to the emitter of transistor 56 by means of capacitor 65 and inductor 66, the latter being connected between ground and the junction between capacitor 65 and the collector of transistor 55. The output signal from tuned filter and gain control 15, may then, in turn, be coupled from the collector of transistor 56 to detector 16 through a variable inductor 67. This output signal will be an amplitude modulated signal when the output frequency of oscillator 9 is in error, and by adjusting the amplitudes of injection of the mixer inputs a substantially 100% modulated signal can be obtained.

Detector stage 16 may include a coupling capacitor 70, one end of which may be connected to a by-pass capacitor 71 to ground, and the other end of which may be connected to the cathode of diode 72 (the other end of which diode is connected to ground) and to the anode of diode 73. The cathode of diode 73 may be connected to a resistor 74 and a capacitor 75, both of which have their other end connected to ground. The amplitude modulated signal received from tuned filter and gain control 15 is detected and produces only the reference, or single tone, voltage if there is no error in the output frequency of oscillator 9.

The detected error voltage may be coupled from the cathode of diode 73 to low pass filter 17 which may include serially connected resistor 78 and charging capacitor 79 and serves to smooth the detected direct error voltage. The output from low pass filter 17 may then be connected to the voltage sensitive element (not shown) of frequency determining network 18 by means of lead 80 to thus close the loop and provide for automatic stabilization of the high frequency oscillator when in a fine tune condition in which the frequency deviation of the high frequency oscillator does not exceed the pass band of the oscillator.

To assure oscillator frequency correction, automatic level control 19 is also connected to lead 80 to divert the direct voltage present at lead 80 to ground whenever the reference voltage exceeds a predetermined level.

Although described and claimed in combination as a part of the stabilizing network of this invention, the automatic level control per se is more fully described and is claimed in pending application Serial No. 80,144, filed January 3, 1961, by Clyde Baxter and Eugene Senti, and entitled "Voltage Monitoring and Controlling Device."

As shown in FIGURE 2, the output from low pass filter 17 may be applied directly to the base of NPN type transistor 83 of automatic level control 19, which transistor is preferably connected as an emitter follower. The emitter of transistor 83 may be connected to ground through resistor 84 and the signal may be coupled from the emitter through a diode 85 to a unijunction transistor 86 and more particularly to the emitter thereof. In addition, a by-pass capacitor 87 to ground may be connected at the junction of the emitter and diode 85, if desired.

Unijunction transistor 86 has two bases, one of which (designated as 88) may be connected to the 18 volt power supply through resistor 25 while the other (designated as 89) may be connected to ground through resistor 90 and to the base of PNP type transistor 91 through serially connected coupling capacitor 92 and diode 93. In addition, a resistor 94 connects the anode of diode 93 with the 18 volt power supply. An RC time constant is provided by resistor 95 (connected from the base of transistor 91 to ground) and capacitor 96 (connected between the base of transistor 91 and the 18 volt power supply through resistor 25) for purposes to be brought out hereinafter. The collector of transistor 91 may be connected to ground through a resistor 97 while the emitter of transistor 91 may be directly connected to the 18 volt power supply through resistor 25. This means, of course, that the 18 volt power supply is connected to the collector of transistor 83 through the resistor 25 and the emitter-collector of transistor 91.

Figure 3:
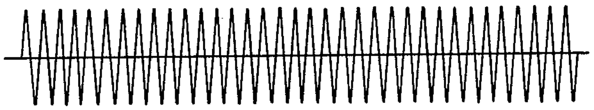
FIGURE 3 illustrates a typical waveform obtained from the high frequency oscillator.
Figure 4:
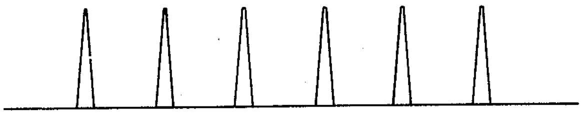
FIGURE 4 illustrates a typical spectrum of referencing frequencies which may be obtained from the spectrum generator.

In operation, a spectrum of referencing frequencies (all of which are spaced 500 kc. utilizing a 500 kc. stable frequency generator and may, for example, extend to 20 megacycles) are obtained from the spectrum generator in a manner well known in the art. This spectrum of referencing frequencies, as shown for example in FIGURE 4, is constantly supplied to mixer 11 (to the collector of transistor 42). The second input to mixer 11 is obtained from the high frequency oscillator (as shown in FIGURE 3 and may, for example, be 12 megacycles).

The signals are mixed at mixer 11 and the tuned filter and gain control 15 is tuned to a multiple of stable frequency generator 13 so that the filter passes only the difference frequency selected (for example, one megacycle).

As will be readily appreciated, the tuned filter will thus pass a single tone (i.e., a single frequency of $2f_1$ if tuned filter 17 is centered at $2f_1$) at all times when no error exists, since the mixing of spaced spectrum frequencies themselves will produce a difference frequency exactly equal to the tuned frequency selected and the high frequency oscillator will be in synchronism with one of these referencing frequencies and hence when mixed with spaced spectrum frequencies will also produce a difference frequency exactly equal to the selected tuned frequency. If an error exists, however, the mixing of the output from the high frequency oscillator with spaced referencing frequencies will not produce a signal exactly at the difference frequency selected and will, in fact, produce three tones. One tone of this three tone signal will be, of course, due to mixing of properly spaced referencing frequencies (i.e., those spaced one megacycle if the tuned filter is tuned to one megacycle) and the other two tones will be due to the mixing of the output of the high frequency oscillator with a referencing frequency above and below the frequency of the oscillator (i.e., mixing of the output of the high frequency oscillator with the nearest referencing frequency one megacycle above and the nearest referencing frequency one megacycle below the oscillator output when tuned filter and gain control 15 is tuned to one megacycle).

In other words, the result of the mixing of the two mixer inputs is a one megacycle signal without appreciable side bands if the high frequency oscillator is in synchronism with one of the referencing frequencies since the two tones obtained from mixing of the oscillator output with the spectrum frequencies will cancel and this will result in only the reference D.C. voltage output (due to single tone) at the detector.

If, however, the output frequency of the monitored oscillator is out of synchronism with one of the referencing frequencies, the signal passed by the tuned filter and gain control will be a one megacycle signal plus and minus the deviation which creates side bands. The tuned filter has only a narrow pass band, however, and the error signal therefore does not necessarily reflect the total deviation. Although this was fatal to capturing the oscillator in some prior art devices, the stabilizing network of this invention can use this error signal to capture the oscillator as brought out hereinafter.

Figure 5:
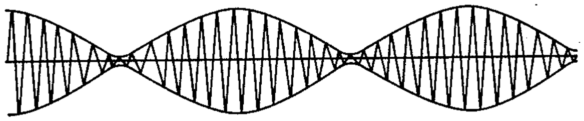
FIGURE 5 illustrates a typical waveform that may be passed by the tuned filter and gain control when the high frequency oscillator is in error.
Figure 6:
FIGURE 6 illustrates the waveform of FIGURE 5 after detection.

As shown in FIGURE 5, when an error signal is passed by tuned filter and gain control 15 (that is, when the oscillator is not locked at the predetermined desired frequency) an amplitude modulated signal results (that is, a one megacycle signal and one megacycle signal plus and minus error as shown by sidebands). This signal is detected by detector 16 and the output therefrom as shown typically by FIGURE 6 will be a direct voltage.

Each spectrum point from spectrum generator 12 mixes with each spectrum point one megacycle away (where $f_1$ is 500 kc. and the filter is tuned to $2f_1$ products) to produce a vector rotating at one megacycle. The output from high frequency oscillator 9, coupled to mixer 11, mixes with the spectrum of frequencies from spectrum generator 12, and more particularly, with the spectrum points nearest to a one megacycle difference therebetween, and, if the output of high frequency oscillator 9 is not spaced exactly one megacycle with respect to these spectrum points, beat frequencies are produced of one megacycle $+\Delta_f$ and one megacycle $-\Delta_f$, where $\Delta_f$ is the frequency error of oscillator 9. As mentioned hereinabove, the three frequencies present at the output of the mixer can be represented as a one megacycle carrier modulated by two tones and all can be represented by vectors. The spectrum points mixing with each other produce the vector rotating at the one megacycle rate while the frequencies at one megacycle $+\Delta_f$ and one megacycle $-\Delta_f$ produce vectors moving at different rates. The peak value of the addition of these vectors is detected at detector 16 and coupled through low pass filter 17 to frequency determining network 18 of oscillator 9. When the D.C. voltage coupled to frequency determining network 18 reaches a predetermined level, the three vectors are moving at the same rate (one megacycle). In the embodiment shown in the drawings, this level is approximately seven volts D.C. When all three vectors are moving at the same rate, there is no relative motion between them. Any inclination of the oscillator to move off frequency after being locked tends to produce a change in the D.C. voltage level coupled to the frequency determining network 18 to adjust the output frequency of oscillator 9 in the same manner as does any phase discriminator. This, of course, will prevent any deviation from the locked frequency and, with no deviation, only the single tone, that is, from the mixing of the one megacycle spaced spectrum points, will be detected and coupled through the filter to frequency determining network 18. If the frequency error of oscillator 9 is larger than the pass band of the phase locking loop (as could occur, for example, when the equipment is initially energized), the amplitude of the D.C. signal will increase gradually until the output frequency of oscillator 9 is so nearly identical to that of one of the spectrum points of the output of spectrum generator 12 as to be within the pass band of the system so that a frequency lock is achieved (if the vectors are rotating slow enough) or until a predetermined maximum amplitude is reached and recycling occurs due to automatic level control 19.

To assure capture of the oscillator the automatic level control 19 senses the direct voltage applied to the frequency determining network and diverts the same to ground when a predetermined level is reached. This is accomplished by applying the signal to unijunction transistor 86 and diverting the signal to ground through the base-collector circuit of transistor 83 and resistor 97 when the predetermined maximum level is reached.

More particularly, the voltage to be sampled is coupled to the base of transistor 83. This sampled voltage is coupled through the base-emitter circuit of transistor 83 to the emitter of unijunction transistor 86. If this monitored voltage reaches the predetermined desired maximum limiting value, unijunction transistor 86 fires and a signal can thereafter be readily passed between the bases. This develops a sharp spike of voltage across resistor 90, which voltage is then coupled through capacitor 92 and diode 93 to the base of normally conductive PNP type transistor 91 to immediately render this transistor nonconductive. Since the collector of transistor 83 is connected through transistor 91 to the power source, the nonconductive state of transistor 91 causes the collector voltage of transistor 83 to drop and causes transistor 83 to be forward biased so that the sampled voltage is immediately diverted through the base-collector circuit of transistor 83 and resistor 95 to ground. The time constant of resistor 95 and capacitor 96 is such that transistor 91 remains in a nonconductive state for a predetermined length of time. When transistor 91 again becomes conductive, sampling will again occur and, until the sampled voltage again reaches the predetermined maximum limiting level, the voltage will not be diverted to ground.

Figure 7:
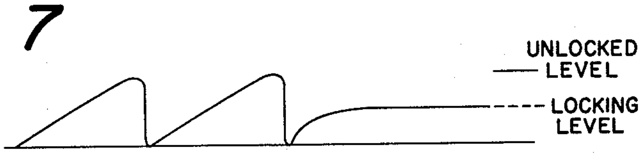
FIGURE 7 illustrates the manner in which the D.C. correction signal is repeatedly applied to the frequency determining network of the high frequency oscillator until the oscillator is captured.

As a result the direct voltage is repeatedly applied to the frequency determining network 18 of oscillator 9 as shown in FIGURE 7. While a predetermined frequency range of the oscillator is swept each time as indicated in FIGURE 7, locking may not occur at first due to the inherent features of closing the loop, such as overshoot, for example. When the oscillator finally reaches the point where it is again in synchronism with one of the referencing frequencies, the voltage will level off as shown in FIGURE 7 and the oscillator will, of course, be stabilized or locked in synchronism with the referencing frequency. The circuit will then continue to monitor the output frequency of the high frequency oscillator in the fine tune condition and should the frequency again tend to deviate direct correcting voltages will again automatically be applied to the frequency determining network to correct the error. Thus, the automatic level control 19 causes the loop to arrive at the fine tune condition where the circuit acts as a phase detector to correct small frequency deviations above and below the desired oscillator frequency, as has been brought out hereinabove. In doing so, it assures that the oscillator can be captured even though the frequency deviation is greater than the pass band and the correcting loop circuitry. It also assures that the oscillator will be locked on frequency without "hanging" since a range of frequencies is swept repeatedly until locking occurs.

For example, if the oscillator frequency is one megacycle above or below the nearest spectrum point, the error signal developed by detector 16 will charge capacitor 79. If the frequency is below, the oscillator will probably lock the first time that the oscillator voltage is swept to the desired frequency (identical to the nearest spectrum point). If above, or if the oscillator fails to lock when swept past the desired frequency, the output frequency of the oscillator will continue to rise until recycled by automatic lock control 19, and then build to the desired frequency, as shown in FIGURE 7.

If the oscillator is only 0.01 megacycle above the desired frequency (this being within the pass band of the system), for example, the rotating vectors will have relative motion therebetween and will result in a changed D.C. voltage output from detector 16, which, of course, when coupled to the voltage sensitive element of frequency determining network 18 causes the output voltage of oscillator 9 to be reduced. In like manner, if the voltage is 0.01 megacycle below the desired frequency, the D.C. voltage output from detector 16 will be changed in the opposite direction to cause the output voltage of oscillator 9 to be increased. Within the pass band of the system, it is therefore obvious that the system acts as a phase detector to maintain the system in lock.

The following is a list of components which may be used to practice this invention utilizing a 500 kc. stable frequency input and a tuned filter of one megacycle:

| Numeral | Type | Value |
|---|---|---|
| 23 | PNP Transistor | 2N1224 |
| 24 | Capacitor | 3,300µf. |
| 25 | Resistor | 10KΩ |
| 26 | do | 5KΩ |
| 27 | do | 4,700Ω |
| 28 | do | 2,700Ω |
| 29 | Capacitor | .3 µf. |
| 32 | NPN Transistor | 2N338 |
| 33 | Capacitor | 430 µf. |
| 34 | Resistor | 2,700Ω |
| 35 | do | 150Ω |
| 36 | do | 22KΩ |
| 37 | Capacitor | .3 µf. |
| 38 | Inductor | 33 µh. |
| 39 | Diode | 1N198 |
| 42 | PNP Transistor | 2N1224 |
| 43 | Capacitor | 5 µf. |
| 44 | do | 43 µf. |
| 45 | Resistor | 1KΩ |
| 46 | do | 220Ω |
| 48 | do | 18KΩ |
| 49 | do | 22KΩ |
| 50 | do | 10KΩ |
| 51 | Capacitor | .3 µf. |
| 54 | do | .3 µf. |
| 55 | PNP Transistor | 2N1224 |
| 56 | do | 2N1224 |
| 57 | Resistor | 10KΩ |
| 58 | do | 22KΩ |
| 59 | do | 10KΩ |
| 60 | do | 18KΩ |
| 61 | do | 22KΩ |
| 62 | do | 10KΩ |
| 63 | Capacitor | .3 µf. |
| 64 | do | .3 µf. |
| 65 | do | 100 µf. |
| 66 | Inductor | 220 µh. |
| 67 | do | Variable |
| 70 | Capacitor | 56 µf. |
| 71 | do | 30 µf. |
| 72 | Diode | 1N457 |
| 73 | do | 1N457 |
| 74 | Resistor | 390KΩ |
| 75 | Capacitor | 20 µf. |
| 78 | Resistor | 3,300Ω |
| 79 | Capacitor | .22 µf. |
| 83 | NPN Transistor | 2N541 |
| 84 | Resistor | 470KΩ |
| 85 | Diode | 1N198 |
| 86 | Unijunction Transistor | 2N489 |
| 87 | Capacitor | 1.8 µf. |
| 90 | Resistor | 220Ω |
| 91 | PNP Transistor | 2N1224 |
| 92 | Capacitor | 40 µf. |
| 93 | Diode | 1N457 |
| 94 | Resistor | 4,700Ω |
| 95 | do | 100KΩ |
| 96 | Capacitor | 4.5 µf. |
| 97 | Resistor | 22KΩ |

It is to be appreciated, of course, that the foregoing is merely illustrative and the invention shown and described herein is not meant to be limited to the particular components listed hereinabove.

It should be evident to one skilled in the art that the stabilizing network of this invention provides an improved and compact stabilization network which need not have a broad pass band but yet can be utilized to correct relatively large frequency deviations of a high frequency oscillator.

What is claimed as our invention is:

1. An automatic frequency control device for stabilizing a high frequency oscillator, comprising: a stable frequency source; means for receiving the output from said source of stable frequency and generating a stable spectrum of referencing frequencies each of which is separated from adjacent frequencies by a frequency $f_1$; a high frequency oscillator having an adjustable voltage sensitive frequency determining network and providing an output frequency $f_2$; mixing means for receiving said referencing frequencies and the output frequency from said oscillator; filter means tuned to pass $nf_1$ products wherein $n$ is an integer greater than 1, said filter means having a relatively narrow pass band and providing an amplitude modulated signal at its output equal to $nf_1 \pm f_3$ wherein $f_3$ corresponds within the limitations of said pass band to the frequency error of the output frequency of said oscillator; detector means connected with said tuned means for receiving the output from said mixing means and providing an output signal the fluctuations of which are determined by $f_3$; means for coupling said output signal from said detector means to said frequency determining network for controlling the frequency of said oscillator; and an automatic level control connected to said last named means for receiving the output of said detector means and in response thereto monitoring the same and reducing said signal to a predetermined minimum value whenever a predetermined maximum value is reached whereby a range of frequencies is repeatedly swept until said frequency error $f_3$ is eleminated.

2. An automatic frequency control device for stabilizing a high frequency oscillator, comprising: means for generating a stable spectrum of referencing frequencies; a high frequency oscillator having an adjustable voltage sensitive frequency determining network, the output frequency of said oscillator being within the frequency range of said stable spectrum of referencing frequencies; an electron control device; means for coupling said referencing frequencies to said electron control device; means for coupling the output frequency of said oscillator to said electron control device; said electron control device having an output electrode from which a difference frequency may be coupled; a tuned filter connected to said output electrode for selecting a difference frequency to be coupled from said electron control device, said filter having a narrow pass band and producing an amplitude modulated signal at its output if the output frequency of said oscillator is not in synchronism with one of said referencing frequencies; a detector connected with said tuned filter for receiving the output therefrom and producing a control voltage; means including a charging capacitor for receiving said control voltage and coupling the same to said frequency determining network; and an electronic level control for discharging said charging capacitor whenever said control exceeds a predetermined magnitude to assure capture of said high frequency oscillator.

3. An automatic frequency control network for stabiliz- a high frequency oscillator, comprising: a high frequency oscillator having a voltage sensitive adjustable frequency determining network; means for producing a spectrum of referencing frequencies each of which are separated by a frequency $f_1$ from adjacent referencing frequencies; mixing means for receiving said spectrum of frequencies and the output frequency of said high frequency oscillator; tuned means connected to the output of said mixing means and passing the frequency $nf_1$ where $n$ is a positive integer greater than 1, said tuned means having a relatively narrow pass band and producing an amplitude modulated signal at its output when the output frequency of said high frequency oscillator is not in synchronism with a preselected said referencing frequency; detector and filter means connected to said tuned means and to said voltage sensitive adjustable frequency determining network whereby said detector and filter means receives the output from said tuned means and produces therefrom a control signal for controlling the output frequency of said high frequency oscillator; and electronic means connected to said detector and filter means for sensing the output therefrom and causing said control signal to be reduced to a predetermined minimum value whenever a predetermined maximum value is reached to thereby permit the output frequency of said high frequency oscillator to sweep a frequency range until said oscillator locks at said preselected referencing frequency.

References Cited in the file of this patent

UNITED STATES PATENTS

| | | |
|---|---|---|
| 2,287,925 | White | June 30, 1942 |
| 2,794,918 | Bourgonjon et al. | June 4, 1957 |
| 2,843,740 | Mantz et al. | July 15, 1958 |
| 2,851,602 | Cramwinchel et al. | Sept. 9, 1958 |
| 2,868,981 | Costas | Jan. 13, 1959 |
| 2,870,330 | Salmet | Jan. 20, 1959 |
| 2,896,169 | Howell | July 21, 1959 |
| 2,956,239 | Hugenholtz et al. | Oct. 11, 1960 |
| 2,972,720 | Hume | Feb. 21, 1961 |
| 3,076,151 | Swanson | Jan. 29, 1963 |

FOREIGN PATENTS

| | | |
|---|---|---|
| 685,991 | Great Britain | Jan. 14, 1953 |
| 724,735 | Great Britain | Feb. 23, 1955 |
| 790,807 | Great Britain | Feb. 19, 1958 |
| 810,153 | Great Britain | Mar. 11, 1959 |
| 833,246 | Great Britain | Apr. 21, 1960 |